(12) United States Patent
Yong

(10) Patent No.: US 11,112,590 B2
(45) Date of Patent: Sep. 7, 2021

(54) METHODS, SYSTEMS, APPARATUSES, AND DEVICES FOR FACILITATING DIAGNOSING MICROSCOPIC OBJECTS IN A SAMPLE OF AN OBJECT

(71) Applicant: Adelle Jia Xin Yong, Austin, TX (US)

(72) Inventor: Adelle Jia Xin Yong, Austin, TX (US)

(*) Notice: Subject to any disclaimer, the term of this patent is extended or adjusted under 35 U.S.C. 154(b) by 0 days.

(21) Appl. No.: 16/984,774

(22) Filed: Aug. 4, 2020

(65) Prior Publication Data

US 2021/0041679 A1 Feb. 11, 2021

Related U.S. Application Data

(60) Provisional application No. 62/883,947, filed on Aug. 7, 2019.

(51) Int. Cl.
| | | |
|---|---|---|
| *G02B 21/00* | (2006.01) | |
| *G02B 21/06* | (2006.01) | |
| *G02B 21/02* | (2006.01) | |
| *G02B 21/36* | (2006.01) | |

(52) U.S. Cl.
CPC ....... *G02B 21/0008* (2013.01); *G02B 21/025* (2013.01); *G02B 21/06* (2013.01); *G02B 21/362* (2013.01)

(58) Field of Classification Search
CPC .. G02B 21/0008; G02B 21/025; G02B 21/06; G02B 21/362

USPC .......................................................... 348/79
See application file for complete search history.

(56) References Cited

U.S. PATENT DOCUMENTS

| | | | | |
|---|---|---|---|---|
| 2019/0243117 | A1* | 8/2019 | Fletcher | G02B 21/36 |
| 2020/0106932 | A1* | 4/2020 | Chou | H04N 5/2252 |
| 2020/0183120 | A1* | 6/2020 | Clark | G02B 7/006 |
| 2020/0252493 | A1* | 8/2020 | Meadows | H04M 1/21 |

* cited by examiner

*Primary Examiner* — Allen C Wong

(57) ABSTRACT

Disclosed herein is a smartphone microscope hardware for facilitating diagnosing microscopic objects in a sample of an object, in accordance with some embodiments. Accordingly, the smartphone microscope hardware may include a smartphone case, a magnifier, a glass slide, and a light source. Further, the smartphone case is configured to interface with a smartphone. Further, the magnifier is attached to the smartphone case. Further, the glass slide is configured for receiving the sample. Further, the camera is configurable for capturing an image of the sample. Further, the magnifier is configured for magnifying the image prior to the capturing. Further, a processing device of the smartphone is configurable for analyzing the image, identifying a microscopic object, and generating a notification. Further, a display device of the smartphone is configurable for displaying the image and the notification. Further, the light source is disposed adjacent to a second side of the glass slide.

20 Claims, 15 Drawing Sheets

METHODS, SYSTEMS, APPARATUSES, AND DEVICES FOR FACILITATING DIAGNOSING MICROSCOPIC OBJECTS IN A SAMPLE OF AN OBJECT

The current application claims a priority to the U.S. Provisional Patent application Ser. No. 62/883,947 filed on Aug. 7, 2019.

FIELD OF THE INVENTION

Generally, the present disclosure relates to the field of medical and laboratory equipment. More specifically, the present disclosure relates to methods, systems, apparatuses, and devices for facilitating diagnosing microscopic objects in a sample of an object.

BACKGROUND OF THE INVENTION

Blood parasites like Malaria (Plasmodium Falciparum), which kills over a million people a year presents a diagnostic challenge to laboratories in most countries. The urgency and importance of obtaining results quickly from the examination of blood samples from patients with suspected acute malaria, render some of the more sensitive methods for malaria diagnosis impractical for routine laboratory use. The majority of malaria cases are found in countries where cost-effectiveness is an important factor and ease of diagnostic test performance and training of personnel are also major considerations.

There are currently two common methods for detecting the presence of *Plasmodium falciparum* in the blood. The first method is the rapid diagnostic tests (RDT). This is a very fast and convenient method and does not require the use of special equipment or training. This method involves collecting a small amount of blood from the patient and applying that on a small card. The presence of special bands on the card after a short time will indicate the presence of the blood parasites. This is currently the most widely used method in the malaria-endemic regions of the world. However, there are several drawbacks to this method. Each card may be only be used once. The reliability of RDT may deteriorate with time, especially depending on the weather of the places in which the RDT are used. The RDT reliability is also affected by the density of the parasites in the blood. During the early phases of infection, when the density of the blood parasites is low, the RDT may not be able to detect the parasites. RDT is also very specific. It may only detect malaria. It may not detect other types of blood parasites that cause other diseases, such as dengue fever. The second method is microscopy. This involves the use of microscopic examination of stained blood films using special stains, such as Giemsa, Wright's, or Field's stains. This is currently the golden standard for detection. This method is cheap, effective, and may identify different species of the parasite and assess parasite density. However, this method requires the use of a reasonably powerful microscope, such as one that may magnify 400 times or more. It also requires the service of a trained lab technician who may identify the blood parasite. In many remote regions, it may not be readily available.

Existing techniques for facilitating diagnosing microscopic objects are deficient with regard to several aspects. For instance, current technologies are time-consuming. Furthermore, current technologies have limitations such as single-use only, and reliability if it is stored for a long time. Further, current technologies require trained lab technicians for identifying the microscopic objects such as the blood parasites. Further, current technologies require various stains for detecting microscopic objects such as blood parasites.

Therefore, there is a need for improved methods, systems, apparatuses, and devices for facilitating diagnosing microscopic objects in a sample of an object that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a smartphone microscope hardware for facilitating diagnosing microscopic objects in a sample of an object, in accordance with some embodiments. Accordingly, the smartphone microscope hardware may include a smartphone case, at least one magnifier, at least one glass slide, and at least one light source. Further, the smartphone case may be configured to interface with a smartphone. Further, the smartphone case may be rigidly attachable to the smartphone. Further, the smartphone case may include an opening juxtaposed to a camera of the smartphone. Further, the at least one magnifier may be attached to the smartphone case. Further, the opening forms a cavity in the smartphone case. Further, the at least one magnifier may be disposed in the cavity. Further, the at least one magnifier may be optically coupled with the camera. Further, the at least one glass slide may be configured for receiving at least one sample of at least one object. Further, the at least one object may include at least one microscopic object. Further, the smartphone case may be disposed adjacent to a first side of the at least one glass slide. Further, the camera of the smartphone may be configurable for capturing at least one image of the at least one sample. Further, the at least one magnifier may be configured for magnifying the at least one image prior to the capturing. Further, a processing device of the smartphone may be configurable for analyzing the at least one image. Further, the processing device may be configurable for identifying the at least one microscopic object based on the analyzing. Further, the processing device may be configurable for generating at least one notification based on the identifying. Further, a display device of the smartphone may be configurable for displaying at least one of the at least one image and the at least one notification. Further, the at least one light source may be disposed adjacent to a second side of the at least one glass slide. Further, the at least one light source may be configured for emitting light. Further, the light may be configured for illuminating the at least one glass slide. Further, the capturing of the image may be based on the illuminating.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
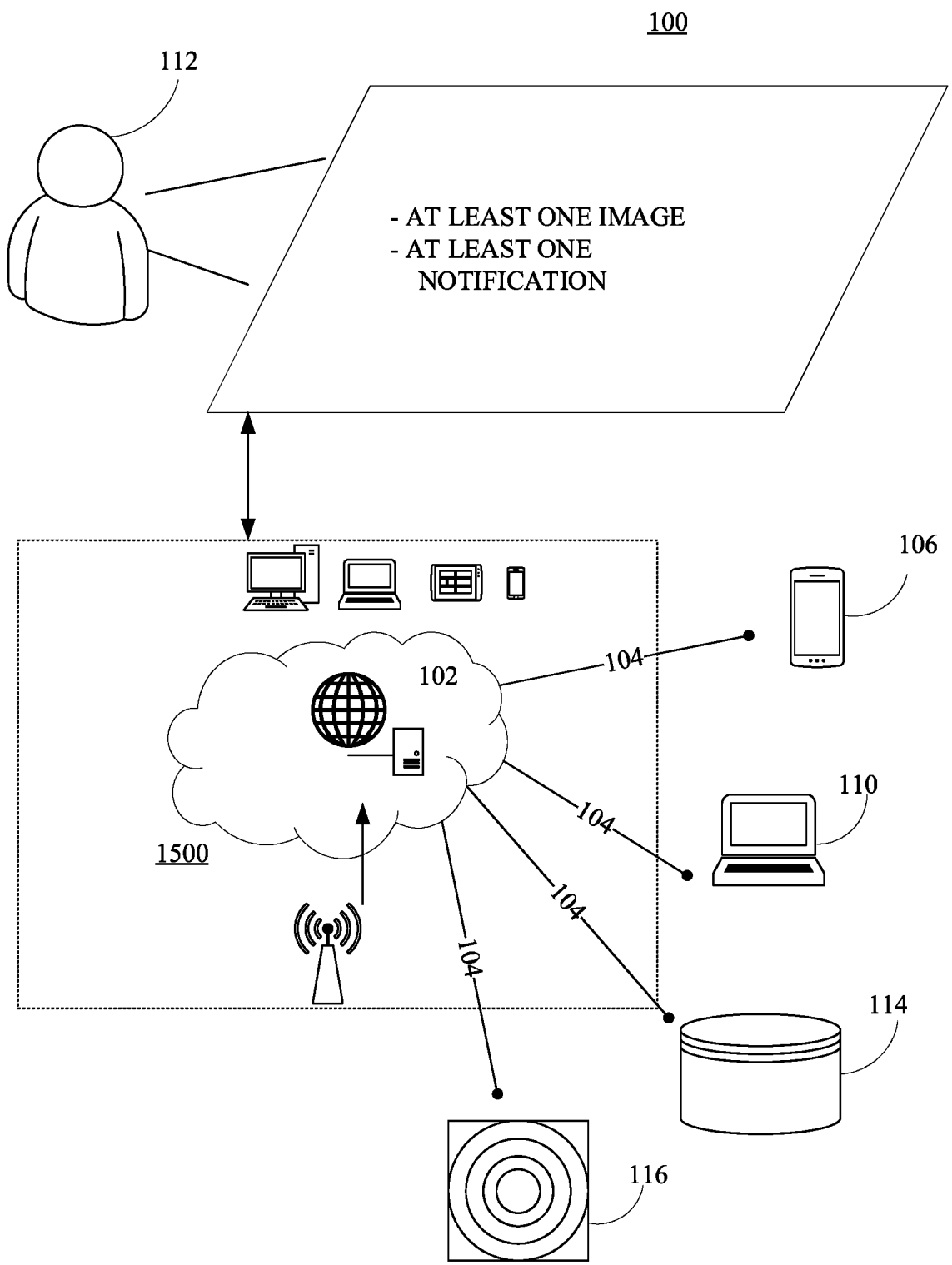
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses and devices for facilitating diagnosing microscopic objects in a sample of an object, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes a smartphone microscope hardware for facilitating diagnosing microscopic objects in a sample of an object. Further, the smartphone microscope hardware may be intended to provide quick and reliable results, with the help of a smartphone and a diagnostic application on the smartphone. The smartphone microscope hardware comprises a smartphone with a built-in camera, a smartphone case that has a glass bead attached to the smartphone case, a glass slide, a first support board, a polarizer, a light source, a second support board, and fastening elements.

Further, the smartphone may include a built-in camera. Further, the smartphone may include any iOS or Android-based phones that have an inbuilt back camera and that has the internal specifications to install the diagnostic application in the smartphone. Further, the smartphone includes Apple iPhone, Samsung Galaxy, OnePlus, Google Pixel, Moto G, LG smartphone, etc. Further, the smartphone microscope hardware may include a smartphone case. The smartphone case comprises an opaque material that rigidly fits the smartphone. The smartphone case comprises a magnifier that is integrated into the smart phone case. The magnifier may be of any shape, size, material, features, type or kind, orientation, location, quantity, components, and arrangements of components. Further, the magnifier is a small glass bead that fits snugly through a hole in the smartphone case. Preferably, the diameter of the hole is the same as the diameter of the glass bead. Furthermore, the hole and the glass bead are positioned in such a way that the glass bead aligns perfectly below and at the center of the inbuilt back camera of the smartphone. Preferably, the glass bead and the hole in the smartphone case has a diameter of approximately 0.5 mm.

Further, the smartphone microscope hardware may include a glass slide. Further, the smartphone microscope hardware facilitates detecting the presence of blood parasites in blood by taking magnified images of the blood sample smeared on the glass slide. The glass slide may be of any shape, size, features, type or kind, orientation, location, quantity, components, and arrangements of components. Further, the glass slide is rectangular in shape and has a thickness of a few millimeters. Further, the smartphone case with the integrated glass bead is placed/positioned over the blood-stained glass slide for image capture. The smartphone microscope hardware comprises a first support board. The first support board may be of any shape, size, material, features, type or kind, orientation, location, quantity, components, and arrangements of components. Further, the first support board comprises a transparent and solid material. Further, materials may include glass, clear plastic, thermo plastics, polycarbonates, etc. The glass slide rest on the first support board and the smartphone case rest on top of the glass slide. Further, according to the preferred embodiment of the present invention, the smart phone case may be formed/modeled (by methods such as, but not limited to 3D printing) in such a way that a flat level surface is created when the smartphone case is placed over the glass slide. In other words, the smartphone case is made in such a way that the thickness and/or other dimensions of the glass slide does not hinder the positioning and/or smooth capture of images of the blood-stained glass slide, through the smartphone camera.

The smartphone microscope hardware comprises a polarizer. The polarizer may be of any shape, size, material, features, type or kind, orientation, location, quantity, components, and arrangements of components. Further, the polarizer comprises two polarized sheets held together by a securing pin, wherein the securing pin is attached to a semi-transparent sheet. The two polarized sheets together, act as a light intensity control mechanism when the two polarized sheets rotate with respect to each other. The semi-transparent sheet serves to prevent a single bright light spot from appearing on the screen.

The smartphone microscope hardware comprises a light source. The light source may be of any shape, size, material, features, type or kind, orientation, location, quantity, components, and arrangements of components. Further, the light source comprises one or more bulbs and is situated right below the polarizer. Further, the polarizer is placed on top of the light source, and hence there are three layers of filter between the light source and the first support board. That is, light from the light source goes through the semi-transparent sheet and the two polarized sheets before hitting the first support board. The first support board passes this light through the first support board's transparent surface and illuminates the glass slide from the bottom surface of the glass slide. According to the preferred embodiment, the polarizer, and in particular the two polarized sheets are identical in size and shape and they completely cover the light source.

The smartphone microscope hardware comprises a second support board. The second support board may be of any shape, size, material, features, type or kind, orientation, location, quantity, components, and arrangements of components. Further, the second support board has dimensions similar to that of the first support board. Further, the second support board holds or supports the light source.

The smartphone microscope hardware comprises fastening elements for securing and holding the first and second support boards at user preferred positions. The fastening elements may be of any shape, size, material, features, type or kind, orientation, location, quantity, components, and arrangements of components. Further, the fastening elements include screws, nuts, rivets, washers, bolts, pins, electrical fasteners, etc. Further, the fastening elements comprise four screws, four nuts, and four metal washers that may be configured to vertically align the first support board above the second support board. Furthermore, the four screws, nuts, and metal washers enable to position the first support board at different vertical heights by adjusting the level of placements of the nuts and metal washers along with the pitch of the threaded screws.

The smartphone has a back camera, which typically protrudes from the phone. The smartphone case is attached rigidly to the smartphone. There is a small glass bead (magnifier) in the smartphone case, and it is positioned at the center of the smartphone camera. A glass slide is smeared with the blood sample, and it rests on top of the transparent first support board. The three layers of filters for the light source are as follows. The first is the semi-transparent paper. The second and third layers of filter are polarized sheets. The polarized sheets are held together by a securing pin which allows the polarized sheets to rotate with respect to each other. Light is provided by a light source, which rests on top of the second support board.

Further, the present disclosure describes a microscope set up, formed with the help of a smartphone and associated hardware, that enables a user to take magnified pictures of blood cells in a given blood sample. Further, the present disclosure describes a diagnostic application that helps find the absence or presence of blood parasites in the given blood sample. Further, the present disclosure describes a cost-effective, reliable, and simple method for blood parasite diagnosis, especially in areas and in situations where the presence of qualified lab technicians and/or lab equipment is limited.

Further, the present disclosure describes an economic and reliable solution that may detect and identify different species of blood parasites without the need for a trained lab technician. The present disclosure describes a smartphone microscope hardware and diagnostic application software that runs on the smartphone. The hardware comprises the built-in camera of the smartphone and other simple hardware components such as a light source, polarizing sheets, a frame for holding the smartphone and a glass slide with the stained blood sample, and a magnifying element. The smartphone microscope hardware and the associated diagnostic application in the smartphone enable a user to take magnified images of a blood sample and diagnose the presence or absence of blood parasites in the blood sample, at the same instant in their smartphone without going to any lab or having the presence of a lab technician. Further, the present disclosure describes a cost-effective and simple device and method for efficiently and quickly diagnosing blood parasites in blood samples, eliminating the need for heavy/costly equipment and/or a trained lab technician.

The present disclosure relates generally to a medical diagnostic device. More specifically the present disclosure relates to a microscopic device that comprises a smartphone and a related software application that can help diagnose parasites in the blood.

FIG. 1 is an illustration of an online platform 100 consistent with various embodiments of the present disclosure. By way of non-limiting example, the online platform 100 to facilitate diagnosing microscopic objects in a sample of an object may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1500.

Figure 2:
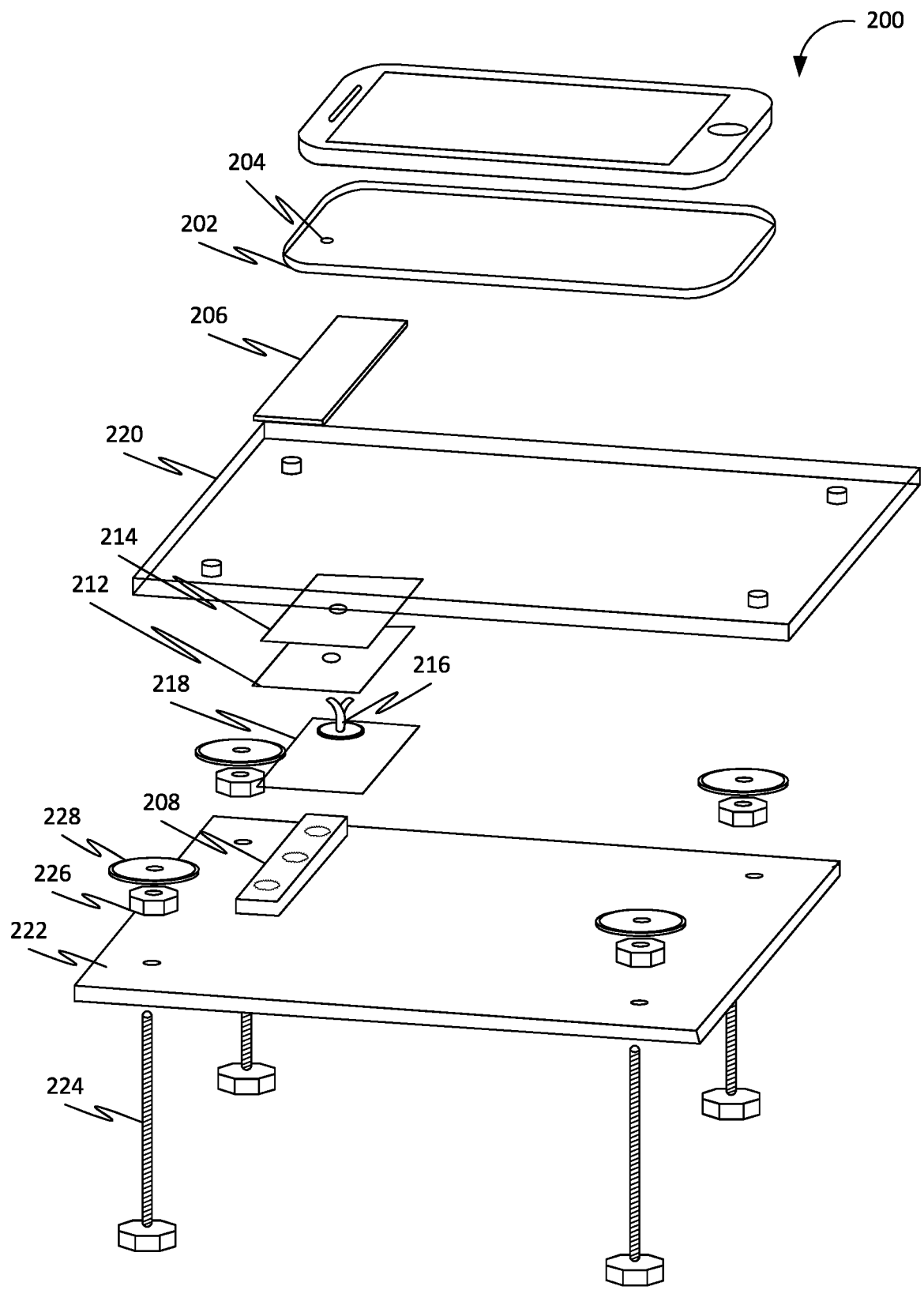
FIG. 2 is an exploded view of a smartphone microscope hardware with a smartphone for facilitating diagnosing microscopic objects in a sample of an object, in accordance with some embodiments.

FIG. 2 is an exploded view of a smartphone microscope hardware 200 with a smartphone for facilitating diagnosing microscopic objects in a sample of an object, in accordance with some embodiments. Further, the smartphone microscope hardware 200 may include a smartphone case 202, at least one magnifier 204, at least one glass slide 206, and at least one light source 208.

Further, the smartphone case 202 may be configured to interface with the smartphone (such as the mobile device 106, the smartphone 1300, etc.). Further, the smartphone case 202 may be rigidly attachable to the smartphone.

Further, the smartphone case 202 may include an opening juxtaposed to a camera (such as the sensors 116) of the smartphone.

Further, the at least one magnifier 204 may be attached to the smartphone case 202. Further, the opening forms a cavity in the smartphone case 202. Further, the at least one magnifier 204 may be disposed in the cavity. Further, the at least one magnifier 204 may be optically coupled with the camera. Further, the at least one magnifier 204 may include at least one of at least one lens and at least one mirror. Further, the at least one lens may include a simple lens, a compound lens, etc. Further, the simple lens may include a biconvex lens, a Plano-convex lens, a positive meniscus lens, a negative meniscus lens, a Plano-concave lens, a biconcave lens, etc. Further, the at least one lens may include a cylindrical lens, an aspheric lens, a Fresnel, a lenticular lens, a gradient index lens, a superlens, etc.

Further, the at least one glass slide 206 may be configured for receiving at least one sample of at least one object. Further, the at least one object may be associated with at least one animal, at least one plant, at least one material, etc. Further, the at least one animal may include a human. Further, the at least one object may include at least one fluid, at least one tissue, etc. Further, the at least one fluid may include blood, urine, saliva, sputum, feces, saliva, etc. Further, the at least one object may include at least one microscopic object. Further, the at least one microscopic object may include at least one microorganism, at least one micro-particle, etc. Further, the at least one microorganism may include at least one parasite. Further, the at least one parasite may include bacteria, fungi, viruses, protozoa, etc. Further, the at least one microorganism may include Blood parasites like Malaria (Plasmodium Falciparum). Further, the smartphone case 202 may be disposed adjacent to a first side of the at least one glass slide 206. Further, the camera of the smartphone may be configurable for capturing at least one image of the at least one sample. Further, the at least one magnifier 204 may be configured for magnifying the at least one image prior to the capturing. Further, a processing device of the smartphone may be configurable for analyzing the at least one image. Further, the processing device may be configurable for identifying the at least one microscopic object based on the analyzing. Further, the processing device may be configurable for generating at least one notification based on the identifying. Further, a display device of the smartphone may be configurable for displaying at least one of the at least one image and the at least one notification. Further, the display device may be configurable for displaying the at least one of the at least one image and the at least one notification to a user (such as the user 112).

Further, the at least one light source 208 may be disposed adjacent to a second side of the at least one glass slide 206. Further, the at least one light source 208 may include a lamp, an incandescent bulb, a mercury vapor lamp, a light-emitting diode (LED), a laser diode (LD), etc. Further, the at least one light source 208 may be configured for emitting light. Further, the light may be associated with at least one power, at least one wavelength, at least one frequency, etc. Further, the light may include coherent light, non-coherent light, etc. Further, the light may be configured for illuminating the at least one glass slide 206. Further, the capturing of the image may be based on the illuminating.

Further, in some embodiments, the at least one magnifier 204 may include a glass bead. Further, the at least one glass bead may be associated with at least one shape. Further, the glass bead may be configured for the magnifying the at least one image based on the at least one shape. Further, the glass bead may be disposed in the cavity. Further, an outer diameter of the glass bead may be equal to an inner diameter of the cavity.

In further embodiments, at least one light control mechanism may be coupled to the at least one light source 208. Further, the at least one light control mechanism may be disposed between the second side of the at least one glass slide 206 and the at least one light source 208. Further, the at least one light control mechanism may be configured for controlling at least one of at least one characteristic and at least one property of the light. Further, the at least one characteristic may include Direction, Intensity, Color, Contrast, and Hardness, etc. Further, the at least one property may include Polarization of light, Dispersion of light, Scattering of light, etc. Further, in an embodiment, the at least one light control mechanism may include at least two optical filters 212-214 and a securing pin 216 attached to the at least two optical filters 212-214. Further, the at least two optical filters 212-214 may include polarizers, Absorption Filters, Interference Filters, Lyot Filters, Refractive Filter, Diffractive Filters, Acousto-optic Filters, etc. Further, the at least two optical filters 212-214 may include at least two polarizing sheets. Further, the at least two optical filters 212-214 may include a first optical filter and a second optical filter. Further, the first optical filter may be disposed on the second optical filter. Further, the securing pin 216 may be configured for rotating the first optical filter in relation to the second optical filter. Further, the at least one characteristic may include an intensity of the light. Further, the rotating may be configured for the controlling of the intensity. Further, in an embodiment, the at least one light control mechanism may include at least one semi-transparent element 218. Further, the at least one semi-transparent element 218 may include a semi-transparent sheet. Further, the at least one property may include a scattering of the light. Further, the at least one semi-transparent element 218 may be configured for controlling the scattering of the light. Further, the scattering of the light prevents at least one single bright spot of the light from appearing on the at least one glass slide 206.

Further, in some embodiments, the processing device may be configurable for magnifying the at least one image. Further, the processing device may be configurable for generating at least one first image based on the magnifying. Further, the at least one first image may be a magnified image of the at least one image. Further, the display device may be configurable for displaying the at least one first image.

Further, in some embodiments, the at least one object may include blood. Further, the at least one sample may include a blood sample. Further, the processing device may be configurable for determining a number of red blood cells in the blood based on the analyzing. Further, the processing device may be configurable for identifying a number of infected red blood cells of the number of blood cells and a number of normal blood cells of the number of blood cells based on the determining. Further, the generating of the at least one notification may be based on the identifying of the number of infected red blood cells and the number of normal blood cells.

Further, in some embodiments, the at least one object may include a plurality of cells. Further, the at least one microscopic object may include at least one microorganism. Further, the at least one microorganism infects at least one cell of the plurality of cells. Further, the processing device may be configurable for determining at least one region of the at least one cell. Further, the at least one region may be infected by the at least one microorganism. Further, the processing device may be configurable for generating at least one second image based on the determining of the at least one region. Further, the display device may be configurable for displaying the at least one second image.

In further embodiments, a first support structure 220 may be coupled with the smartphone case 202. Further, the first support structure 220 may be configured for aligning with the opening of the smartphone case 202. Further, the first support structure 220 may be configured for removably receiving the at least one glass slide 206. Further, the at least one glass slide 206 aligns with the camera based on the aligning. Further, in an embodiment, the first support structure 220 may be disposed between the second side of the at least one glass slide 206 and the at least one light source 208. Further, the first support structure 220 may include at least one optically transparent material. Further, the at least one optically transparent material facilitates the illuminating of the at least one glass slide 206 from the second side.

In further embodiments, a second support structure 222 may be coupled with the first support structure 220. Further, the second support structure 222 may be aligned with the first support structure 220. Further, the second support structure 222 may be disposed in at least one of a position and an orientation in relation to the first support structure 220. Further, the second support structure 222 may be configured for receiving the at least one light source 208. Further, the at least one light source 208 may be associated with at least one of a first position and a first orientation in relation to the at least one glass slide 206 based on the at least one of the position and the orientation of the second support structure 222.

In further embodiments, at least one fastening element 224-228 may be coupled with at least one of the first support structure 220 and the second support structure 222. Further, the at least one fastening element 224-228 may be configured for securing the second support structure 222 in relation to the first support structure 220 in the at least one of the position and the orientation. Further, in an embodiment, the position may include a primary position and a secondary position. Further, the at least one fastening element 224-228 may be configured for transitioning the second support structure 222 between the primary position and the secondary position. Further, the transitioning modifies the at least one of the first position and the first orientation of the at least one light source 208 in relation to the at least one glass slide 206.

Further, in some embodiments, the processing device may be configurable for generating at least one machine learning model. Further, the at least one machine learning model may be configured for identifying the at least one organism. Further, the analyzing of the at least one image may be based on the at least one machine learning model. Further, a storage device of the smartphone may be configurable for storing the at least one machine learning model.

Figure 3:
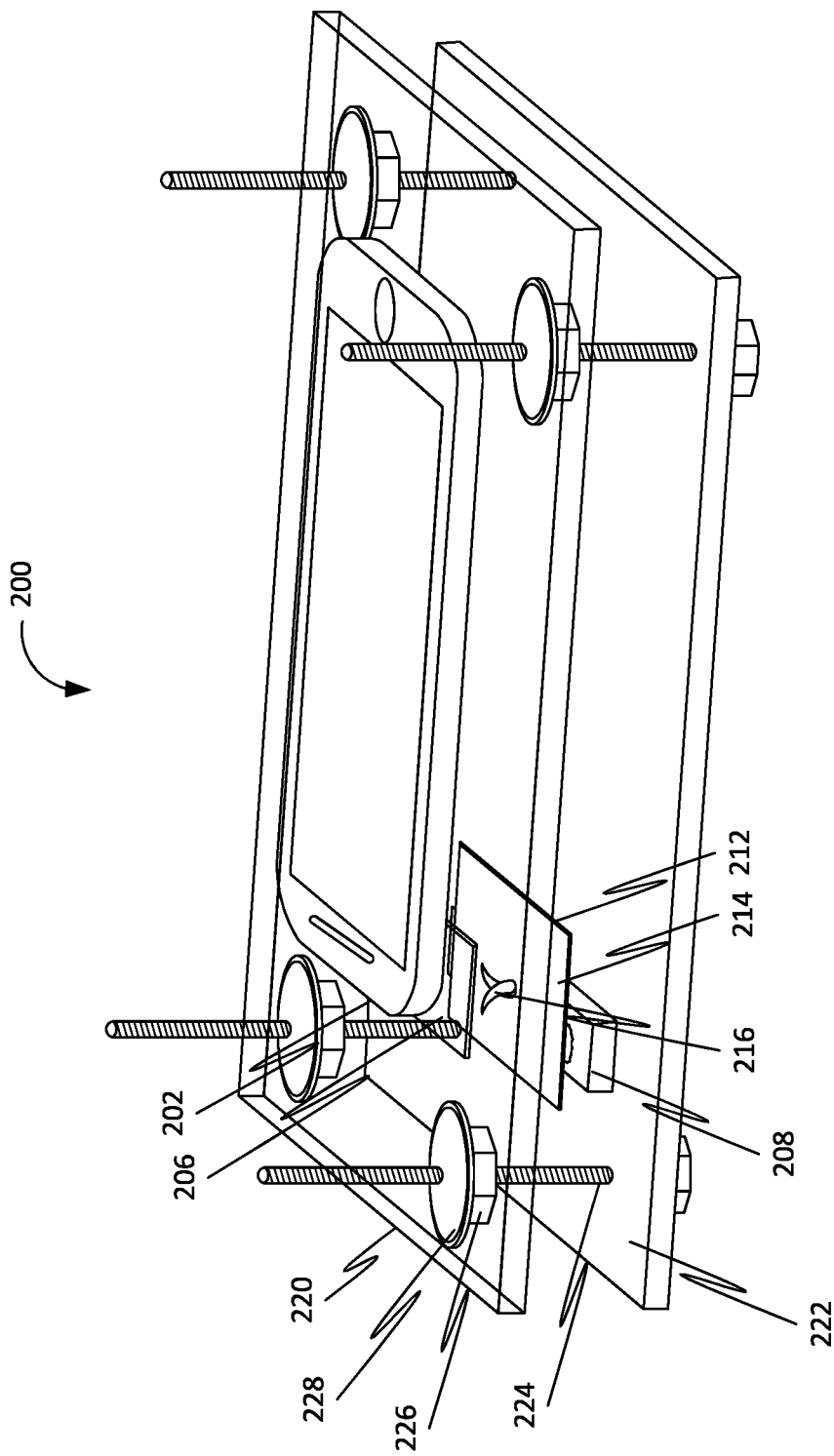
FIG. 3 is a perspective view of the smartphone microscope hardware with the smartphone, in accordance with some embodiments.

FIG. 3 is a perspective view of the smartphone microscope hardware 200 with the smartphone, in accordance with some embodiments.

Figure 4:
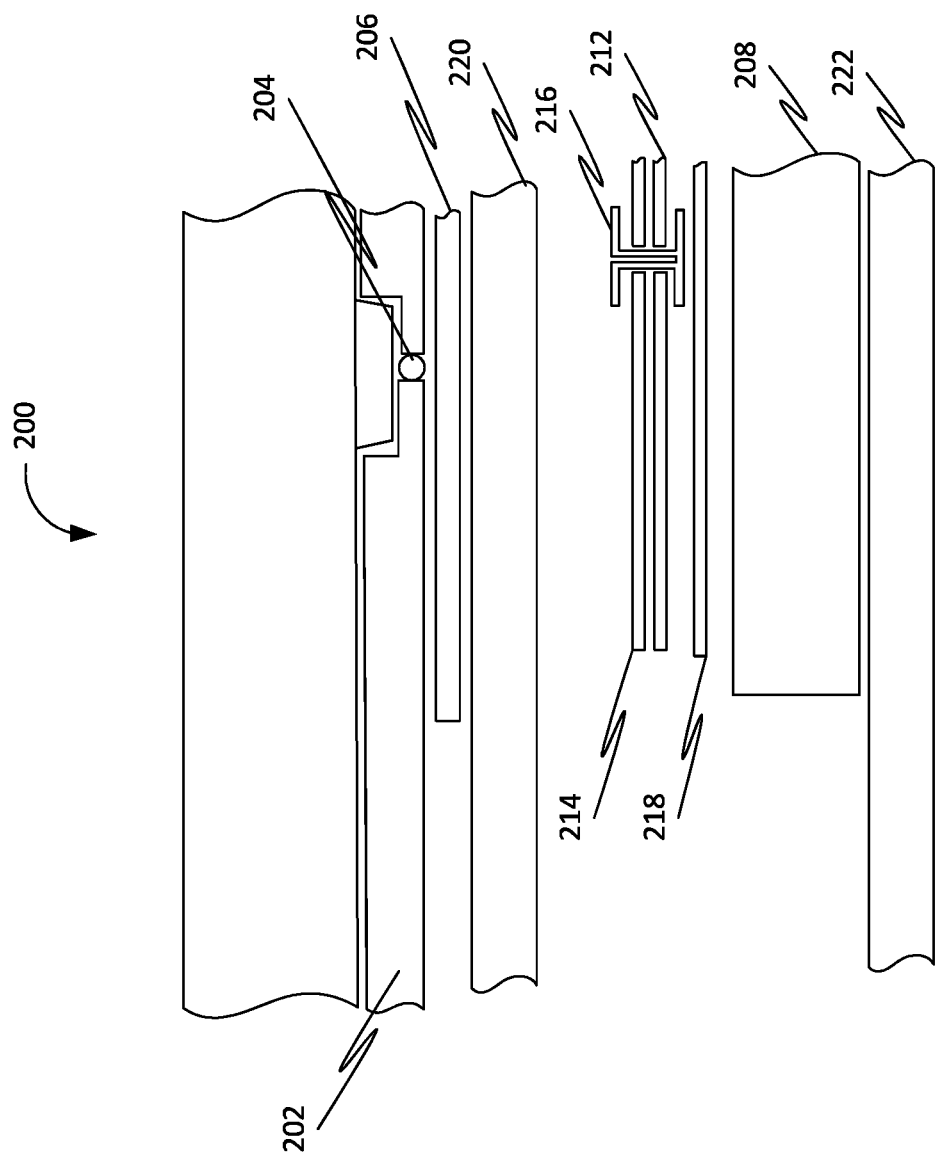
FIG. 4 is a partial cross-sectional side view of the smartphone microscope hardware 200 with the smartphone, in accordance with some embodiments.

FIG. 4 is a partial cross-sectional side view of the smartphone microscope hardware 200 with the smartphone, in accordance with some embodiments.

Figure 5:
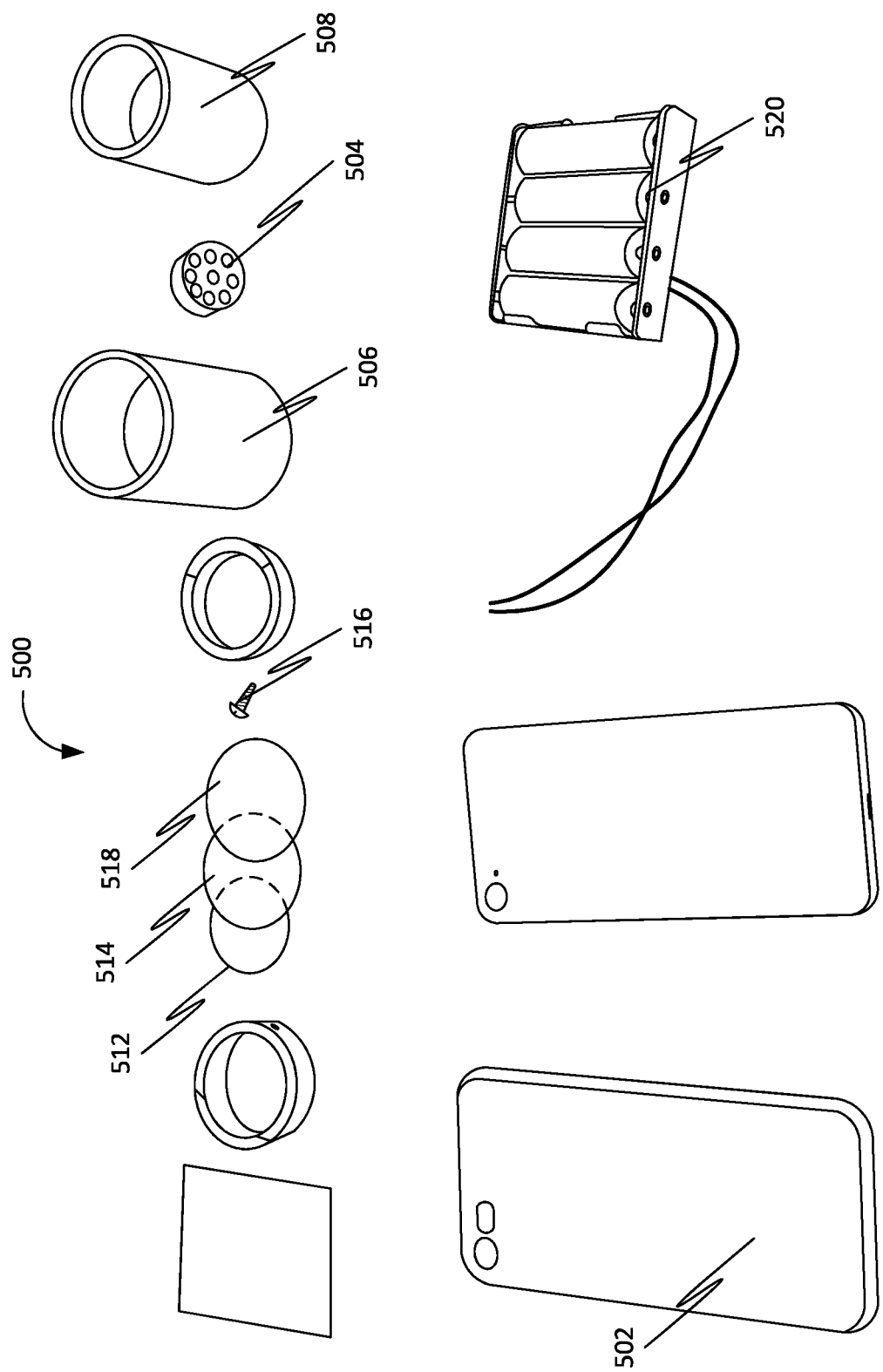
FIG. 5 is a disassembled view of a smartphone microscope hardware with a smartphone for facilitating diagnosing microscopic objects in a sample of an object, in accordance with some embodiments.
Figure 8:
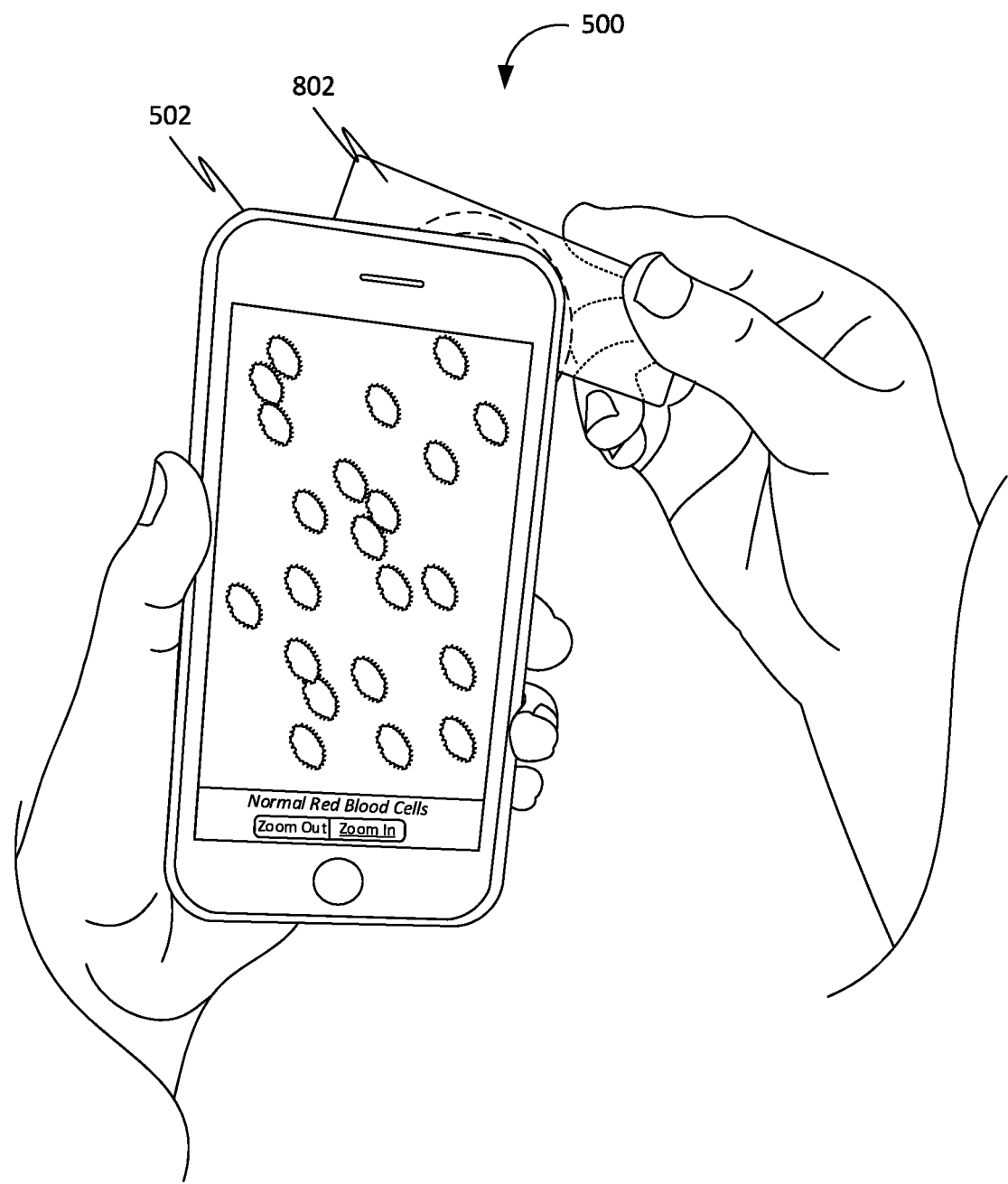
FIG. 8 is a front view of the smartphone microscope hardware with the smartphone, in accordance with some embodiments.

FIG. 5 is a disassembled view of a smartphone microscope hardware 500 with a smartphone for facilitating diagnosing microscopic objects in a sample of an object, in accordance with some embodiments. Further, the smartphone microscope hardware 500 may include a smartphone case 502, at least one magnifier, at least one glass slide 802, as shown in FIG. 8, and at least one light source 504, at least one light control mechanism, a first support structure 506, a second support structure 508.

Further, the at least one light control mechanism may include at least two optical filters 512-514 and a securing pin 516 attached to the at least two optical filters 512-514. Further, in an embodiment, the at least one light control mechanism may include at least one semi-transparent element 518.

Further, the first support structure 506 may be coupled with the smartphone case 502. Further, the first support structure 506 may be configured for aligning with an opening of the smartphone case 502. Further, the first support structure 506 may be configured for removably receiving the at least one glass slide 802. Further, the first support structure 506 may include a first hollow cylindrical structure. Further, a first end of the first hollow cylindrical structure may be attached to the smartphone case 502.

Further, the second support structure 508 may be coupled with the first support structure 506. Further, the second support structure 508 may be aligned with the first support structure 506. Further, the second support structure 508 may be disposed in at least one of a position and an orientation in relation to the first support structure 506. Further, the second support structure 508 may be configured for receiving the at least one light source 504. Further, the second support structure 508 may include a second hollow cylindrical structure. Further, the second hollow cylindrical structure may be coaxially aligned with the first hollow cylindrical. Further, the second hollow cylindrical structure may be disposed within the first hollow cylindrical structure. Further, the at least one light source 504 may be disposed on a base end of the second hollow cylindrical structure.

In further embodiments, a power source 520 may be electrically coupled with the at least one light source 504. Further, the at least one light source 504 may include an electric-powered light source. Further, the power source 520 may be configured for powering the at least one light source 504. Further, the at least one light source 504 may be configured for emitting the light based on the powering. Further, the power source 520 may include at least one battery. Further, the power source may be disposed on the smartphone case 502.

Figure 6:
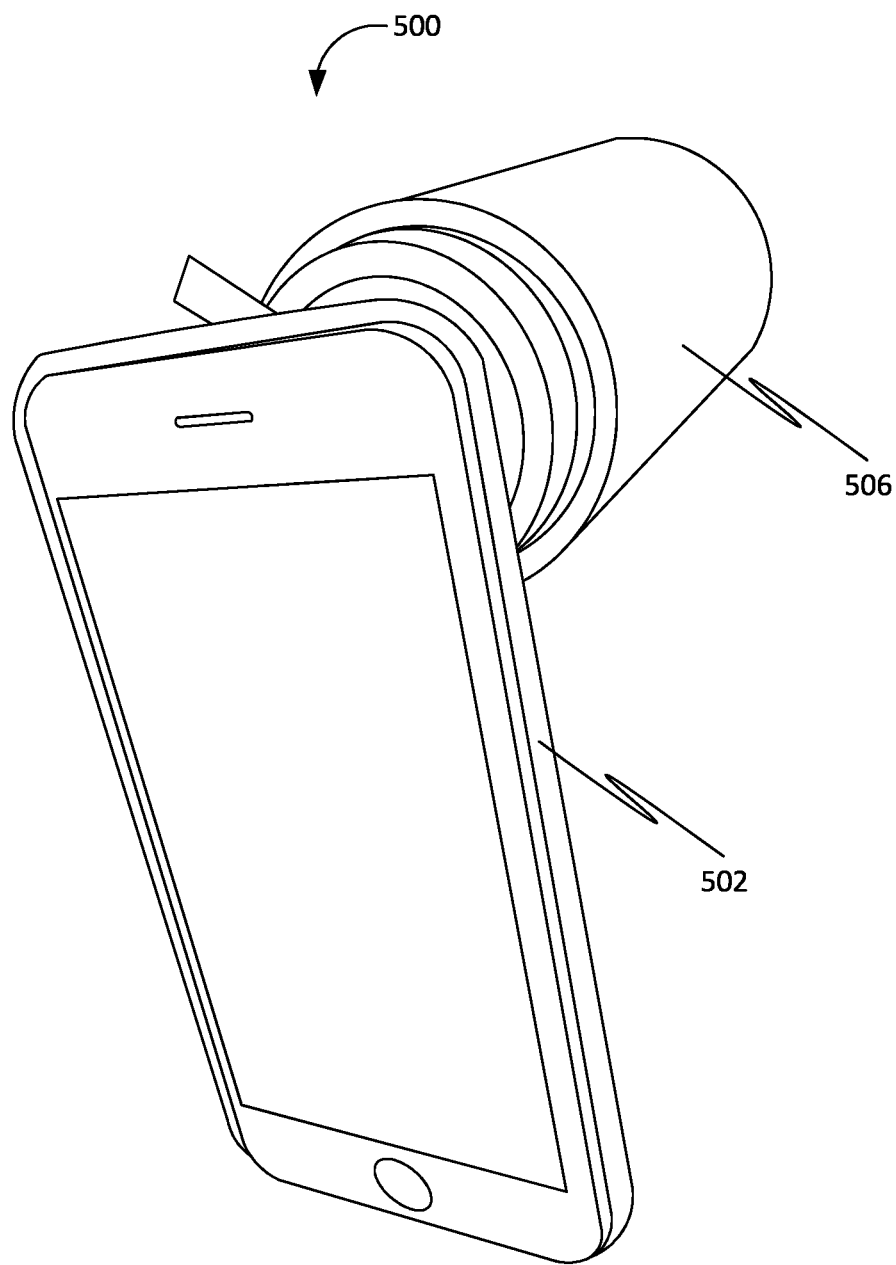
FIG. 6 is a side perspective view of the smartphone microscope hardware with the smartphone, in accordance with some embodiments.

FIG. 6 is a side perspective view of the smartphone microscope hardware 500 with the smartphone, in accordance with some embodiments. Further, FIG. 6 is an assembled view of the smartphone microscope hardware 500 with the smartphone.

Figure 7:
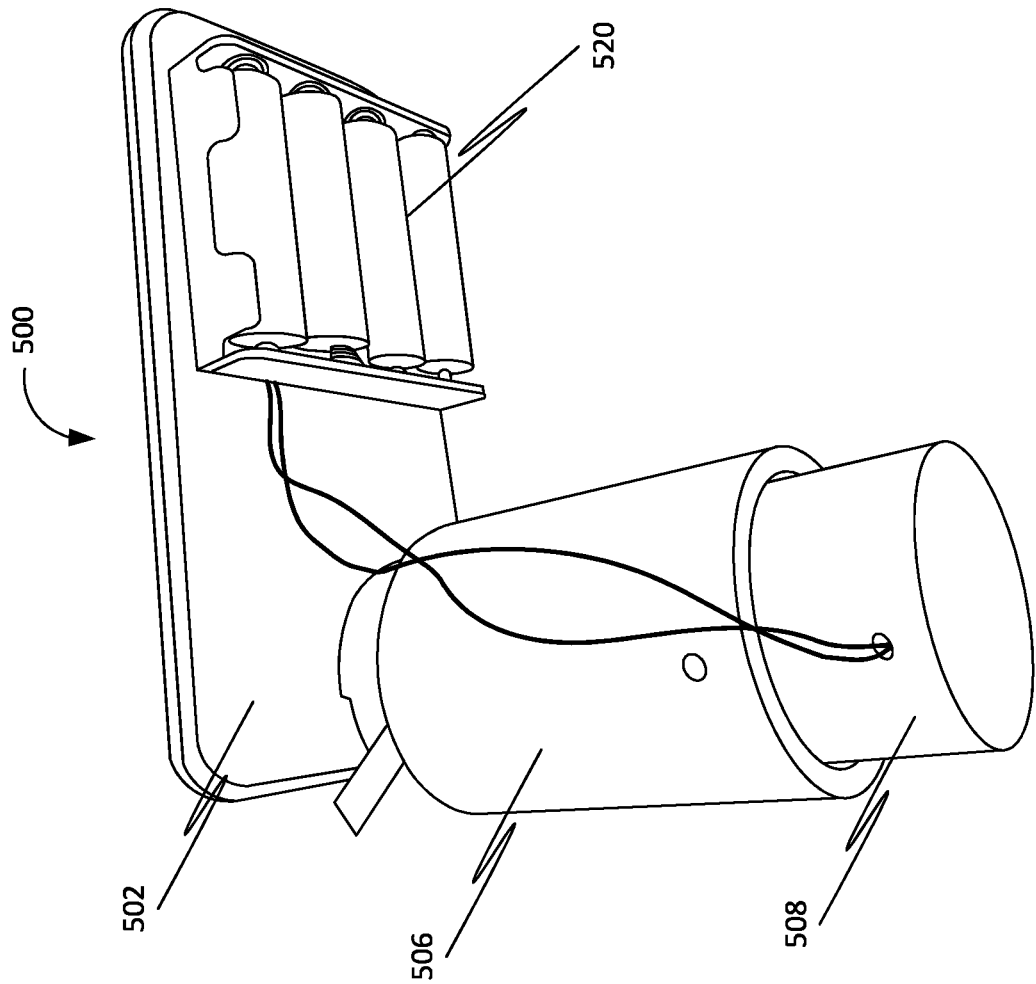
FIG. 7 is a rear perspective view of the smartphone microscope hardware, in accordance with some embodiments.

FIG. 7 is a rear perspective view of the smartphone microscope hardware 500, in accordance with some embodiments.

FIG. 8 is a front view of the smartphone microscope hardware 500 with the smartphone, in accordance with some embodiments.

Figure 9:
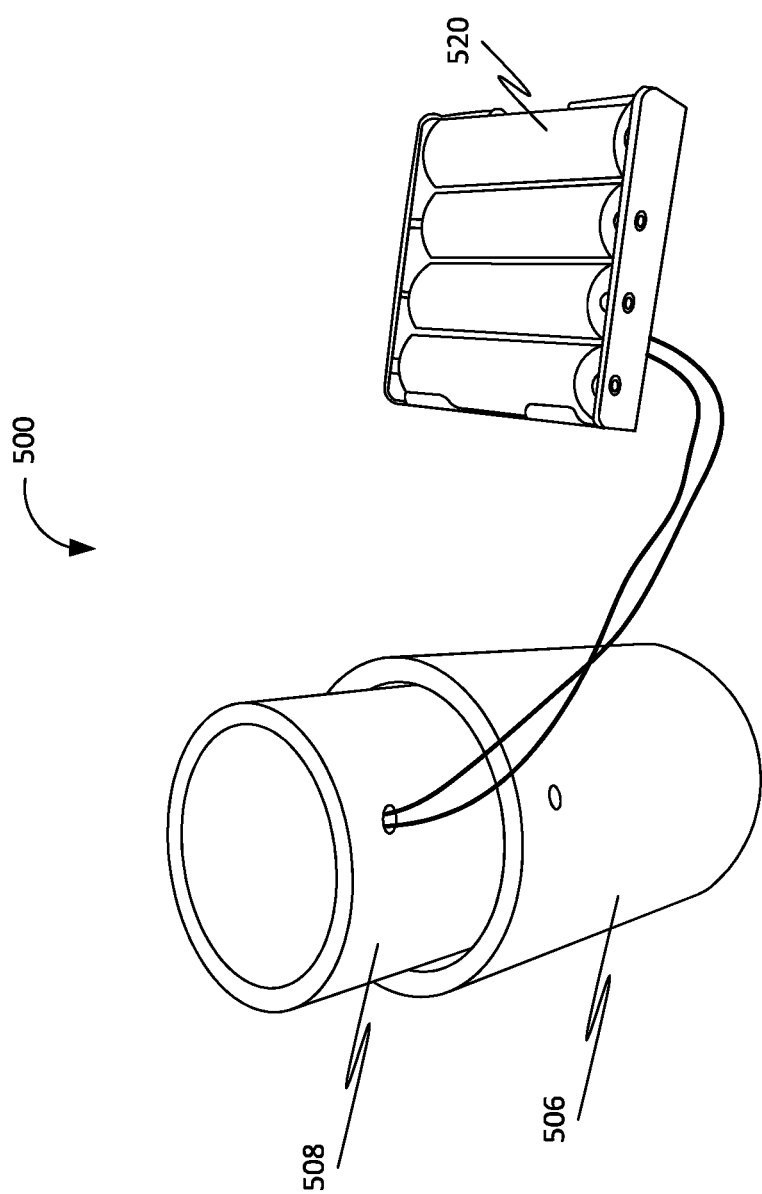
FIG. 9 is a perspective view of the smartphone microscope hardware without the smartphone case, in accordance with some embodiments.

FIG. 9 is a perspective view of the smartphone microscope hardware 500 without the smartphone case 502, in accordance with some embodiments.

Figure 10:
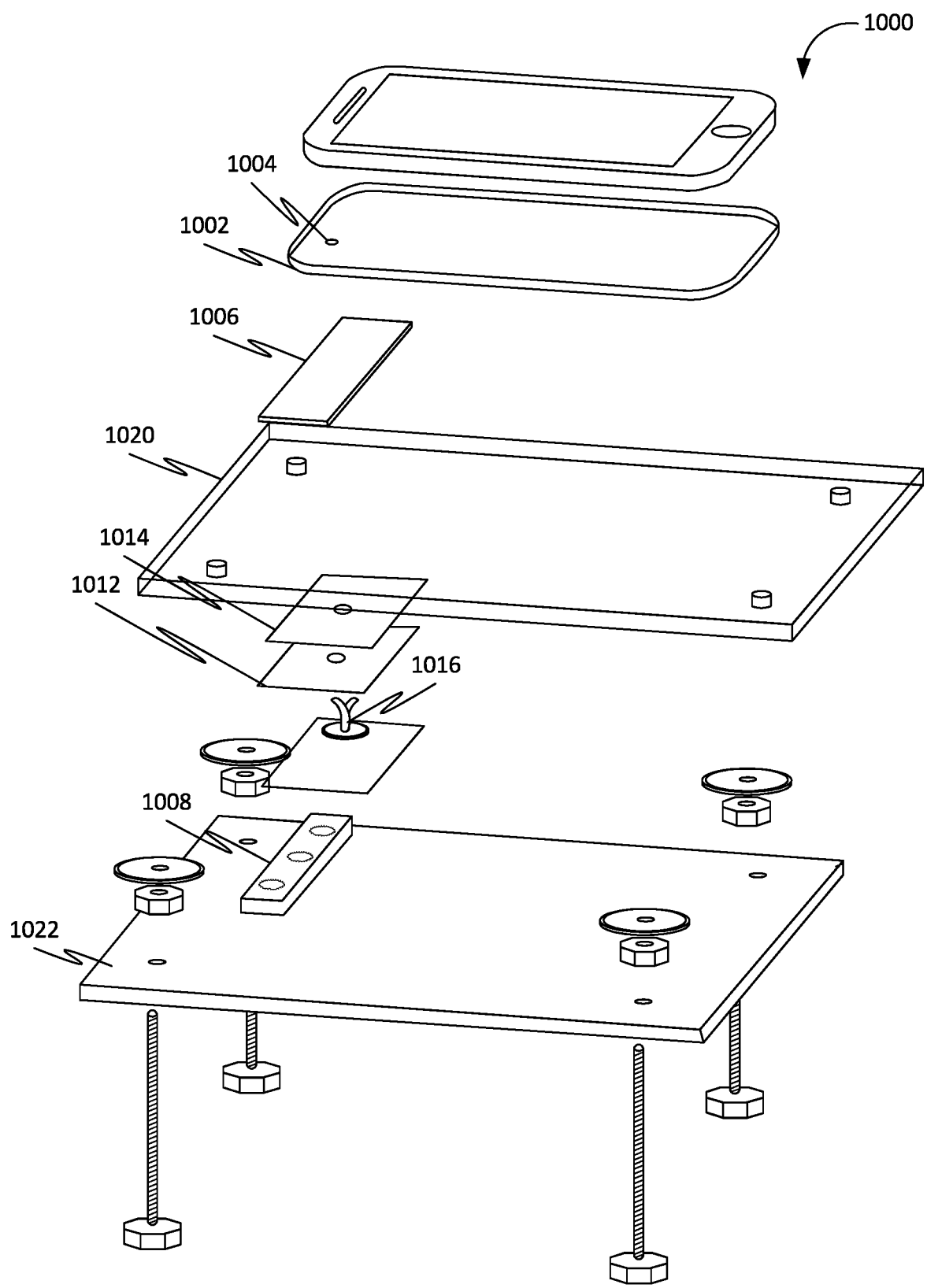
FIG. 10 is an exploded view of a smartphone microscope hardware with a smartphone for facilitating diagnosing microscopic objects in a sample of an object, in accordance with some embodiments.

FIG. 10 is an exploded view of a smartphone microscope hardware 1000 with a smartphone for facilitating diagnosing microscopic objects in a sample of an object, in accordance with some embodiments. Further, the smartphone microscope hardware 1000 may include a smartphone case 1002, at least one magnifier 1004, at least one glass slide 1006, and at least one light source 1008.

Further, the smartphone case 1002 may be configured to interface with a smartphone. Further, the smartphone case 1002 may be rigidly attachable to the smartphone. Further, the smartphone case 1002 may include an opening juxtaposed to a camera of the smartphone.

Further, the at least one magnifier 1004 may be attached to the smartphone case 1002. Further, the opening forms a cavity in the smartphone case 1002. Further, the at least one magnifier 1004 may be disposed in the cavity. Further, the at least one magnifier 1004 may include a glass bead. Further, the at least one glass bead may be associated with at least one shape. Further, the glass bead may be configured for the magnifying the at least one image based on the at least one shape. Further, the glass bead may be disposed in the cavity. Further, an outer diameter of the glass bead may be equal to an inner diameter of the cavity. Further, the at least one magnifier 1004 may be optically coupled with the camera.

Further, the at least one glass slide 1006 may be configured for receiving at least one sample of at least one object. Further, the at least one object may include at least one microscopic object. Further, the smartphone case 1002 may be disposed adjacent to a first side of the at least one glass slide 1006. Further, the camera of the smartphone may be configurable for capturing at least one image of the at least one sample. Further, the at least one magnifier 1004 may be configured for magnifying the at least one image prior to the capturing. Further, a processing device of the smartphone may be configurable for analyzing the at least one image. Further, the processing device may be configurable for identifying the at least one microscopic object based on the analyzing. Further, the processing device may be configurable for generating at least one notification based on the identifying. Further, a display device of the smartphone may be configurable for displaying at least one of the at least one image and the at least one notification.

Further, the at least one light source 1008 may be disposed adjacent to a second side of the at least one glass slide 1006. Further, the at least one light source 1008 may be configured for emitting light. Further, the light may be configured for illuminating the at least one glass slide 1006. Further, the capturing of the image may be based on the illuminating.

In further at least one light control mechanism may be coupled to the at least one light source 1008. Further, the at least one light control mechanism may be disposed between the second side of the at least one glass slide 1006 and the at least one light source 1008. Further, the at least one light control mechanism may be configured for controlling at least one of at least one characteristic and at least one property of the light. Further, in an embodiment, the at least one light control mechanism may include at least two optical filters 1012-1014 and a securing pin 1016 attached to the at least two optical filters 1012-1014. Further, the at least two optical filters 1012-1014 may include a first optical filter and a second optical filter. Further, the first optical filter may be disposed on the second optical filter. Further, the securing pin 1016 may be configured for rotating the first optical filter in relation to the second optical filter. Further, the at least one characteristic may include an intensity of the light. Further, the rotating may be configured for the controlling of the intensity.

In further embodiments, a first support structure 1020 may be coupled with the smartphone case 1002. Further, the first support structure 1020 may be configured for aligning with the opening of the smartphone case 1002. Further, the first support structure 1020 may be configured for removably receiving the at least one glass slide 1006. Further, the at least one glass slide 1006 aligns with the camera based on the aligning.

In further embodiments, a second support structure 1020 may be coupled with the first support structure 1020. Further, the second support structure 1020 may be aligned with the first support structure 1020. Further, the second support structure 1020 may be disposed in at least one of a position and an orientation in relation to the first support structure 1020. Further, the second support structure 1020 may be configured for receiving the at least one light source 1008. Further, the at least one light source 1008 may be associated with at least one of a first position and a first orientation in relation to the at least one glass slide 1006 based on the at least one of the position and the orientation of the second support structure 1020.

Figure 11:
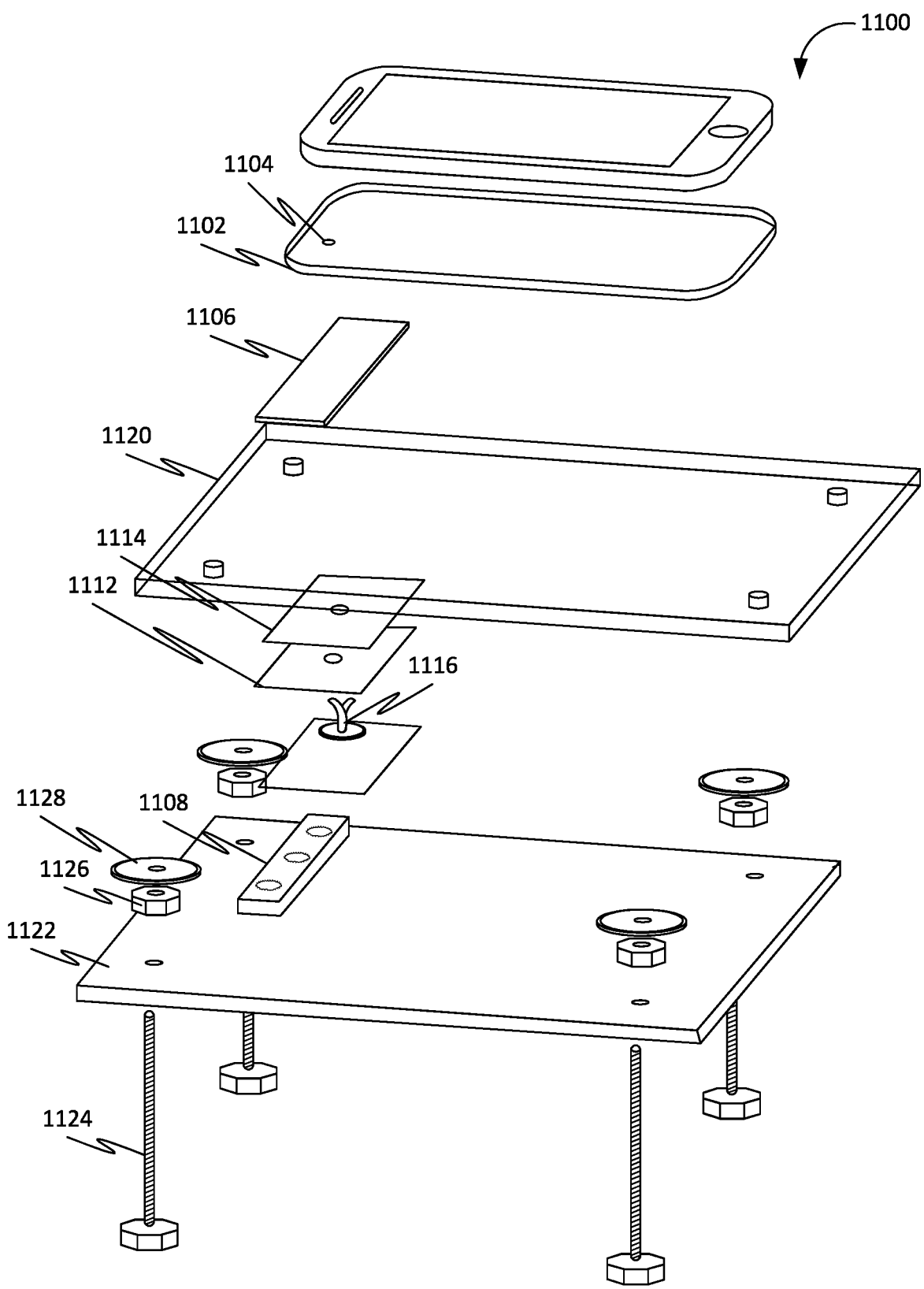
FIG. 11 is an exploded view of a smartphone microscope hardware with a smartphone for facilitating diagnosing microscopic objects in a sample of an object, in accordance with some embodiments.

FIG. 11 is an exploded view of a smartphone microscope hardware 1100 with a smartphone for facilitating diagnosing microscopic objects in a sample of an object, in accordance with some embodiments. Further, the smartphone microscope hardware 1100 may include a smartphone case 1102, at least one magnifier 1104, at least one glass slide 1106, at least one light source 1108, at least one light control mechanism, a first support structure 1120, a second support structure 1122, and at least one fastening element 1124-1128.

Further, the smartphone case 1102 may be configured to interface with a smartphone. Further, the smartphone case 1102 may be rigidly attachable to the smartphone. Further, the smartphone case 1102 may include an opening juxtaposed to a camera of the smartphone.

Further, the at least one magnifier 1104 may be attached to the smartphone case 1102. Further, the opening forms a cavity in the smartphone case 1102. Further, the at least one magnifier 1104 may include a glass bead. Further, the glass bead may be disposed in the cavity. Further, an outer diameter of the glass bead may be equal to an inner diameter of the cavity. Further, the at least one magnifier 1104 may be optically coupled with the camera.

Further, the at least one glass slide 1106 may be configured for receiving at least one sample of at least one object. Further, the at least one object may include at least one microscopic object. Further, the at least object may include blood. Further, the at least one microscopic object may include at least one microorganism. Further, the smartphone case 1102 may be disposed adjacent to a first side of the at least one glass slide 1106. Further, the camera of the smartphone may be configurable for capturing at least one image of the at least one sample. Further, the at least one magnifier 1104 may be configured for magnifying the at least one image prior to the capturing. Further, a processing device of the smartphone may be configurable for analyzing the at least one image. Further, the processing device may be configurable for identifying the at least one microscopic object based on the analyzing. Further, the processing device may be configurable for generating at least one notification based on the identifying. Further, a display device of the smartphone may be configurable for displaying at least one of the at least one image and the at least one notification.

Further, the at least one light source 1108 may be disposed adjacent to a second side of the at least one glass slide 1106. Further, the at least one light source 1108 may include at least one light bulb. Further, the at least one light bulb may be configured for emitting light. Further, the light may be configured for illuminating the at least one glass slide 1106. Further, the capturing of the image may be based on the illuminating.

Further, the at least one light control mechanism may be coupled to the at least one light source 1108. Further, the at least one light control mechanism may be disposed between the second side of the at least one glass slide 1106 and the at least one light source 1108. Further, the at least one light control mechanism may be configured for controlling at least one of at least one characteristic and at least one property of the light. Further, the at least one light controlling mechanism may include at least two polarizing sheets 1112-1114 and a securing pin 1116 attached to the at least two polarizing sheets 1112-1114. Further, the at least two polarizing sheets 1112-1114 may include a first polarizing sheet and a second polarizing sheet. Further, the first polarizing sheet may be disposed on the second polarizing sheet. Further, the securing pin 1116 may be configured for rotating the first polarizing sheet in relation to the second polarizing sheet. Further, the at least one characteristic may include an intensity of the light. Further, the rotating may be configured for the controlling of the intensity;

Further, the first support structure 1120 may be coupled with the smartphone case 1102. Further, the first support structure 1120 may be configured for aligning with the opening of the smartphone case 1102. Further, the first support structure 1120 may be configured for removably receiving the at least one glass slide 1106. Further, the at least one glass slide 1106 aligns with the camera based on the aligning; and Further, the second support structure 1122 may be coupled with the first support structure 1120. Further, the second support structure 1122 may be aligned with the first support structure 1120. Further, the second support structure 1122 may be disposed in at least one of a position and an orientation in relation to the first support structure 1120. Further, the second support structure 1122 may be configured for receiving the at least one light source 1108. Further, the at least one light source 1108 may be associated with at least one of a first position and a first orientation in relation to the at least one glass slide 1106 based on the at least one of the position and the orientation of the second support structure 1122.

Further, the at least one fastening element 1124-1128 may be coupled with at least one of the first support structure 1120 and the second support structure 1122. Further, the at least one fastening element 1124-1128 may be configured for securing the second support structure 1122 in relation to the first support structure 1120 in the at least one of the position and the orientation.

Figure 12:
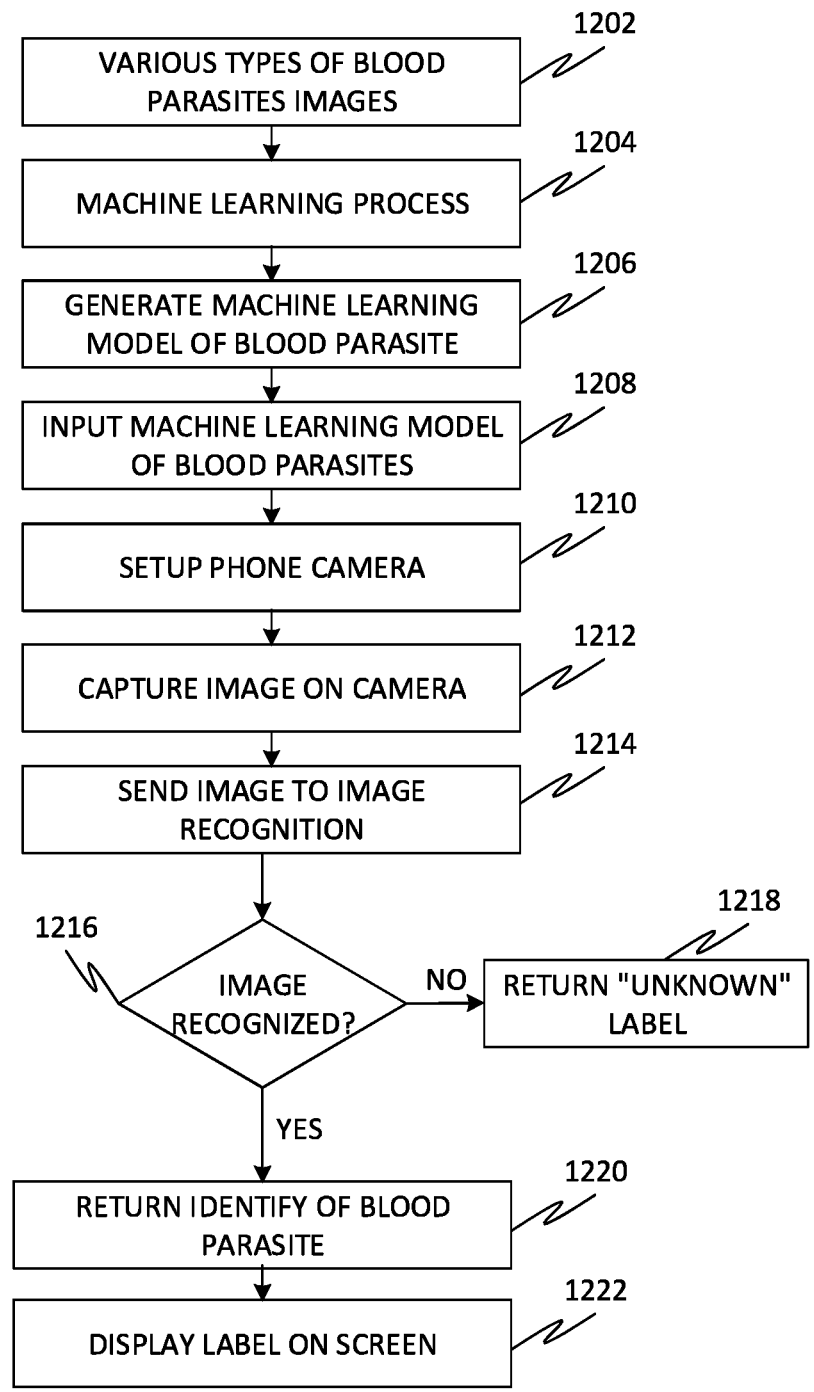
FIG. 12 is a flow diagram of a diagnostic application running on a smartphone for facilitating diagnosing microscopic objects in a sample of an object, in accordance with some embodiments.

FIG. 12 is a flow diagram of a diagnostic application running on a smartphone for facilitating diagnosing microscopic objects in a sample of an object, in accordance with some embodiments. Further, the diagnostic application may create a machine learning model of the various types of blood parasites. Further, the machine learning model may be created by inputting various types of blood parasite images 1202 into a machine learning process 1204. Accordingly, a machine learning model may be generated 1206. Further, the machine learning model may be used by the diagnostic application to identify the blood parasite detected from a camera of the smartphone. Further, the identifying of the blood parasite may be done by inputting the machine learning model back into the diagnostic application 1208. Further, setting up the phone camera 1210 and capturing the image through the camera 1212. Further, the image may be directed to the image recognition flow 1214, which compares the image with the model 1216. If there is a match, the image recognition process will return the identity of the image 1220. If there is no match, the image recognition process will return an "unknown" 1218. The identity is displayed on the screen of the smartphone together with the image captured 1222.

Figure 13:
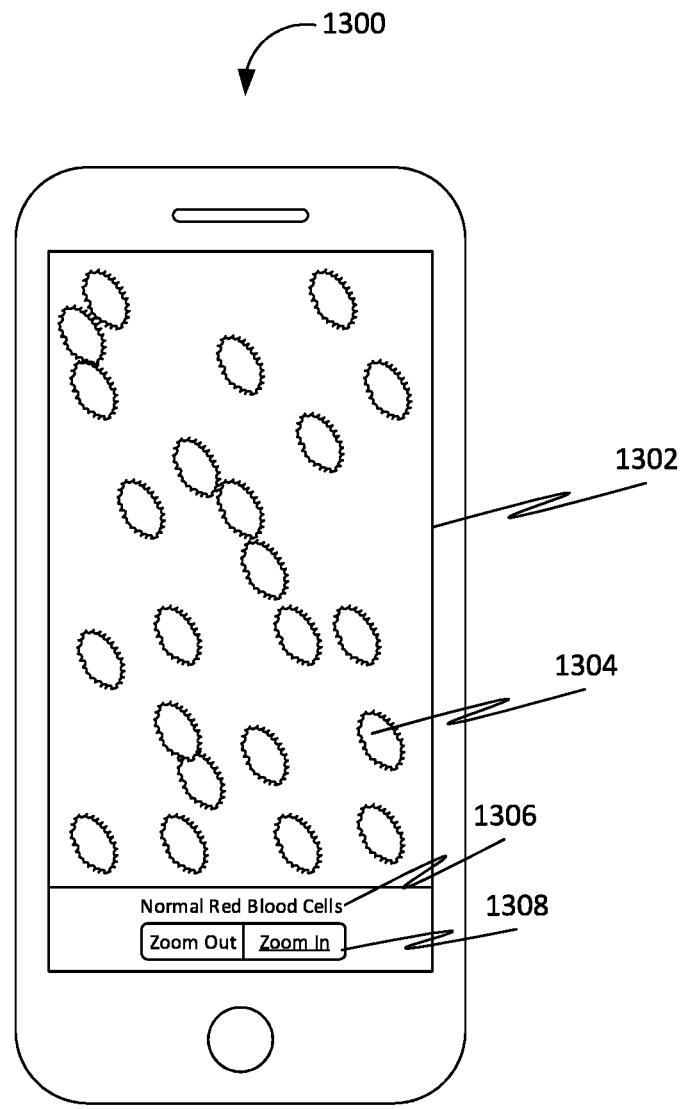
FIG. 13 is a front view of a smartphone running the diagnostic application, in accordance with some embodiments.

FIG. 13 is a front view of a smartphone 1300 running the diagnostic application, in accordance with some embodiments. Further, the smartphone 1300 may display an image 1304 on a screen 1302 of the smartphone 1300. Further, the image 1304 may include normal red blood cells that may be detected using the diagnostic application.

Figure 14:
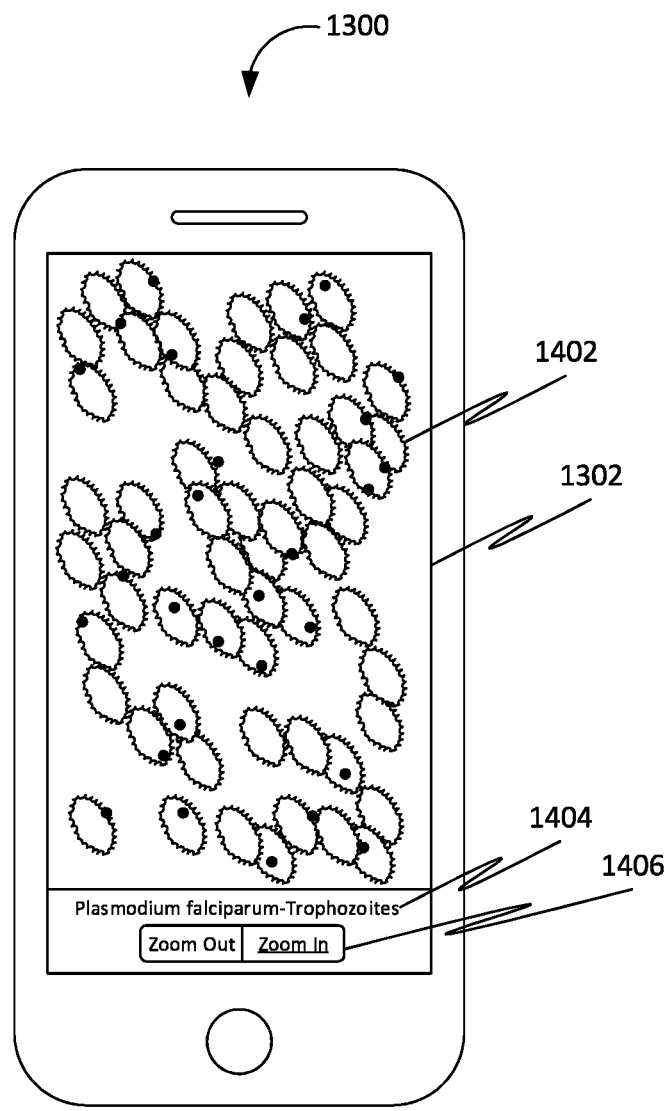
FIG. 14 is a front view of the smartphone running the diagnostic application, in accordance with some embodiments.

FIG. 14 is a front view of the smartphone 1300 running the diagnostic application, in accordance with some embodiments. Further, the smartphone 1300 may display an image 1402 on the screen 1302 of the smartphone 1300. Further, the image 1402 may include the red blood cells and the parasite *Plasmodium falciparum* on the red blood cells that may be detected using the diagnostic application.

As seen in FIG. 13 and FIG. 14, an image (1304 and 1402) captured from a camera of the smartphone 1300 may displayed on the screen 1302 of the smartphone 1300 and an identity (1306 and 1404) of the image (1304 and 1402) captured may be displayed. Furthermore, the diagnostic application may include an additional control (1308 and 1406) for zooming the image.

Further, in some embodiments, the diagnostic application may include a feature that may count the number of infected cells and/or find the proportion of infected cells to normal red blood cells. Further, the feature may help to diagnose the intensity of the infection on the affected person. Further, in some embodiments, the diagnostic application may include an additional display feature, that may outline a region of the infected cells in the display screen. Further, the additional display feature may accurately and clearly display the infected region which provides ease of operation and diagnosis even for someone who may not be trained in the field. Further, the additional display feature may outline the infected region using any shape, color or format.

Figure 15:
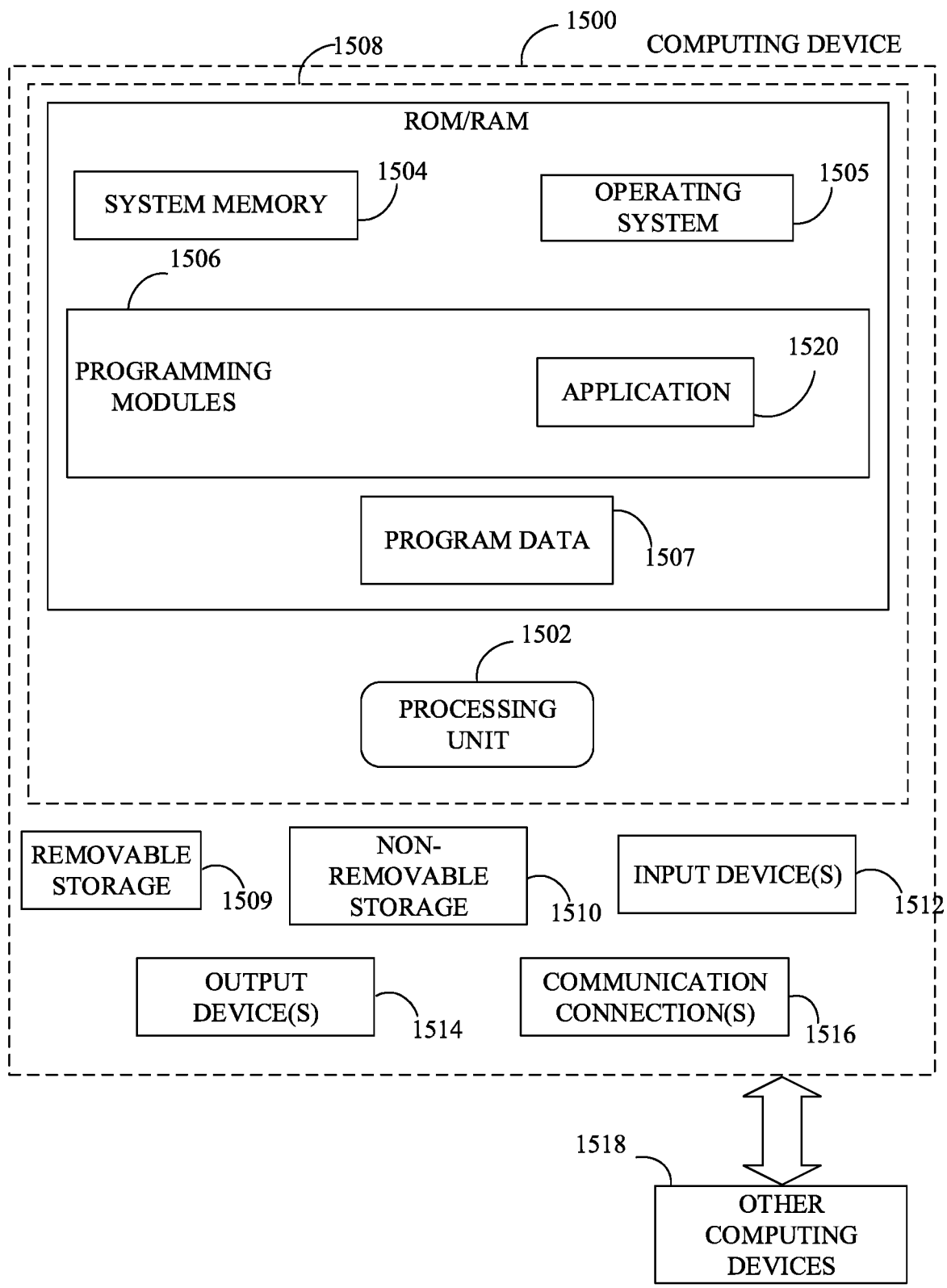
FIG. 15 is a block diagram of a computing device for implementing the methods disclosed herein, in accordance with some embodiments.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and non-volatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1504, including operating system 1505. While executing on processing unit 1502, programming modules 1506 (e.g., application 1520 such as a media player) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A smartphone microscope hardware for facilitating diagnosing microscopic objects in a sample of an object, the smartphone microscope hardware comprising:
   a smartphone case configured to interface with a smartphone, wherein the smartphone case is rigidly attachable to the smartphone, wherein the smartphone case comprises an opening juxtaposed to a camera of the smartphone;
   at least one magnifier attached to the smartphone case, wherein the opening forms a cavity in the smartphone case, wherein the at least one magnifier is disposed in the cavity, wherein the at least one magnifier is optically coupled with the camera;
   at least one glass slide configured for receiving at least one sample of at least one object, wherein the at least one object comprises at least one microscopic object, wherein the smartphone case is disposed adjacent to a first side of the at least one glass slide, wherein the camera of the smartphone is configurable for capturing at least one image of the at least one sample, wherein the at least one magnifier is configured for magnifying the at least one image prior to the capturing, wherein a processing device of the smartphone is configurable for:
   analyzing the at least one image;
   identifying the at least one microscopic object based on the analyzing; and
   generating at least one notification based on the identifying, wherein a display device of the smartphone is configurable for displaying at least one of the at least one image and the at least one notification; and
   at least one light source disposed adjacent to a second side of the at least one glass slide, wherein the at least one light source is configured for emitting light, wherein the light is configured for illuminating the at least one glass slide, wherein the capturing of the image is based on the illuminating.

2. The smartphone microscope hardware of claim 1, wherein the at least one magnifier comprises a glass bead, wherein the at least one glass bead is associated with at least one shape, wherein the glass bead is configured for the magnifying the at least one image based on the at least one shape, wherein the glass bead is disposed in the cavity, wherein an outer diameter of the glass bead is equal to an inner diameter of the cavity.

3. The smartphone microscope hardware of claim 1 further comprising at least one light control mechanism coupled to the at least one light source, wherein the at least one light control mechanism is disposed between the second side of the at least one glass slide and the at least one light source, wherein the at least one light control mechanism is configured for controlling at least one of at least one characteristic and at least one property of the light.

4. The smartphone microscope hardware of claim 3, wherein the at least one light control mechanism comprises at least two optical filters and a securing pin attached to the at least two optical filters, wherein the at least two optical filters comprises a first optical filter and a second optical filter, wherein the first optical filter is disposed on the second optical filter, wherein the securing pin is configured for rotating the first optical filter in relation to the second optical filter, wherein the at least one characteristic comprises an intensity of the light, wherein the rotating is configured for the controlling of the intensity.

5. The smartphone microscope hardware of claim 3, wherein the at least one light control mechanism comprises at least one semi-transparent element, wherein the at least one property comprises a scattering of the light, wherein the at least one semi-transparent element is configured for controlling the scattering of the light, wherein the scattering of the light prevents at least one single bright spot of the light from appearing on the at least one glass slide.

6. The smartphone microscope hardware of claim 1, wherein the processing device is configurable for:
   magnifying the at least one image; and
   generating at least one first image based on the magnifying, wherein the display device is configurable for displaying the at least one first image.

7. The smartphone microscope hardware of claim 1, wherein the at least one object comprises blood, wherein the at least one sample comprises a blood sample, wherein the processing device is configurable for:
   determining a number of red blood cells in the blood based on the analyzing; and
   identifying a number of infected red blood cells of the number of blood cells and a number of normal blood cells of the number of blood cells based on the determining, wherein the generating of the at least one notification is based on the identifying of the number of infected red blood cells and the number of normal blood cells.

8. The smartphone microscope hardware of claim 1, wherein the at least one object comprises a plurality of cells, wherein the at least one microscopic object comprises at least one microorganism, wherein the at least one microorganism infects at least one cell of the plurality of cells, wherein the processing device is configurable for:
   determining at least one region of the at least one cell, wherein the at least one region is infected by the at least one microorganism; and
   generating at least one second image based on the determining of the at least one region, wherein the display device is configurable for displaying the at least one second image.

9. The smartphone microscope hardware of claim 1 further comprising a first support structure coupled with the smartphone case, wherein the first support structure is configured for aligning with the opening of the smartphone case, wherein the first support structure is configured for removably receiving the at least one glass slide, wherein the at least one glass slide aligns with the camera based on the aligning.

10. The smartphone microscope hardware of claim 9, wherein the first support structure disposed between the second side of the at least one glass slide and the at least one light source, wherein the first support structure comprises at least one optically transparent material, wherein the at least one optically transparent material facilitates the illuminating of the at least one glass slide from the second side.

11. The smartphone microscope hardware of claim 9 further comprising a second support structure coupled with the first support structure, wherein the second support structure is aligned with the first support structure, wherein the second support structure is disposed in at least one of a position and an orientation in relation to the first support structure, wherein the second support structure is configured for receiving the at least one light source, wherein the at least one light source is associated with at least one of a first position and a first orientation in relation to the at least one glass slide based on the at least one of the position and the orientation of the second support structure.

12. The smartphone microscope hardware of claim 11 further comprising at least one fastening element coupled with at least one of the first support structure and the second support structure, wherein the at least one fastening element is configured for securing the second support structure in relation to the first support structure in the at least one of the position and the orientation.

13. The smartphone microscope hardware of claim 12, wherein the position comprises a primary position and a secondary position, wherein the at least one fastening element is configured for transitioning the second support structure between the primary position and the secondary position, wherein the transitioning modifies the at least one of the first position and the first orientation of the at least one light source in relation to the at least one glass slide.

14. The smartphone microscope hardware of claim 1, wherein the processing device is configurable for generating at least one machine learning model, wherein the at least one machine learning model is configured for identifying the at least one organism, wherein the analyzing of the at least one image is based on the at least one machine learning model, wherein a storage device of the smartphone is configurable for storing the at least one machine learning model.

15. A smartphone microscope hardware for facilitating diagnosing microscopic objects in a sample of an object, the smartphone microscope hardware comprising:
  a smartphone case configured to interface with a smartphone, wherein the smartphone case is rigidly attachable to the smartphone, wherein the smartphone case comprises an opening juxtaposed to a camera of the smartphone;
  at least one magnifier attached to the smartphone case, wherein the opening forms a cavity in the smartphone case, wherein the at least one magnifier is disposed in the cavity, wherein the at least one magnifier comprises a glass bead, wherein the at least one glass bead is associated with at least one shape, wherein the glass bead is configured for the magnifying the at least one image based on the at least one shape, wherein the glass bead is disposed in the cavity, wherein an outer diameter of the glass bead is equal to an inner diameter of the cavity, wherein the at least one magnifier is optically coupled with the camera;
  at least one glass slide configured for receiving at least one sample of at least one object, wherein the at least one object comprises at least one microscopic object, wherein the smartphone case is disposed adjacent to a first side of the at least one glass slide, wherein the camera of the smartphone is configurable for capturing at least one image of the at least one sample, wherein the at least one magnifier is configured for magnifying the at least one image prior to the capturing, wherein a processing device of the smartphone is configurable for:
    analyzing the at least one image;
    identifying the at least one microscopic object based on the analyzing; and
    generating at least one notification based on the identifying, wherein a display device of the smartphone is configurable for displaying at least one of the at least one image and the at least one notification; and
  at least one light source disposed adjacent to a second side of the at least one glass slide, wherein the at least one light source is configured for emitting light, wherein the light is configured for illuminating the at least one glass slide, wherein the capturing of the image is based on the illuminating.

16. The smartphone microscope hardware of claim 15 further comprising at least one light control mechanism coupled to the at least one light source, wherein the at least one light control mechanism is disposed between the second side of the at least one glass slide and the at least one light source, wherein the at least one light control mechanism is configured for controlling at least one of at least one characteristic and at least one property of the light.

17. The smartphone microscope hardware of claim 16, wherein the at least one light control mechanism comprises at least two optical filters and a securing pin attached to the at least two optical filters, wherein the at least two optical filters comprises a first optical filter and a second optical filter, wherein the first optical filter is disposed on the second optical filter, wherein the securing pin is configured for rotating the first optical filter in relation to the second optical filter, wherein the at least one characteristic comprises an intensity of the light, wherein the rotating is configured for the controlling of the intensity.

18. The smartphone microscope hardware of claim 15 further comprising a first support structure coupled with the smartphone case, wherein the first support structure is configured for aligning with the opening of the smartphone case, wherein the first support structure is configured for removably receiving the at least one glass slide, wherein the at least one glass slide aligns with the camera based on the aligning.

19. The smartphone microscope hardware of claim 18 further comprising a second support structure coupled with the first support structure, wherein the second support structure is aligned with the first support structure, wherein the second support structure is disposed in at least one of a position and an orientation in relation to the first support structure, wherein the second support structure is configured for receiving the at least one light source, wherein the at least one light source is associated with at least one of a first position and a first orientation in relation to the at least one glass slide based on the at least one of the position and the orientation of the second support structure.

20. A smartphone microscope hardware for facilitating diagnosing microscopic objects in a sample of an object, the smartphone microscope hardware comprising:
  a smartphone case configured to interface with a smartphone, wherein the smartphone case is rigidly attachable to the smartphone, wherein the smartphone case comprises an opening juxtaposed to a camera of the smartphone;
  at least one magnifier attached to the smartphone case, wherein the opening forms a cavity in the smartphone case, wherein the at least one magnifier comprises a glass bead, wherein the glass bead is disposed in the cavity, wherein an outer diameter of the glass bead is equal to an inner diameter of the cavity, wherein the at least one magnifier is optically coupled with the camera;
  at least one glass slide configured for receiving at least one sample of at least one object, wherein the at least one object comprises at least one microscopic object, wherein the at least object comprises blood, wherein the at least one microscopic object comprises at least one microorganism, wherein the smartphone case is disposed adjacent to a first side of the at least one glass slide, wherein the camera of the smartphone is configurable for capturing at least one image of the at least one sample, wherein the at least one magnifier is configured for magnifying the at least one image prior to the capturing, wherein a processing device of the smartphone is configurable for:

analyzing the at least one image;

identifying the at least one microscopic object based on the analyzing; and generating at least one notification based on the identifying, wherein a display device of the smartphone is configurable for displaying at least one of the at least one image and the at least one notification;

at least one light source disposed adjacent to a second side of the at least one glass slide, wherein the at least one light source comprises at least one light bulb, wherein the at least one light bulb is configured for emitting light, wherein the light is configured for illuminating the at least one glass slide, wherein the capturing of the image is based on the illuminating;

at least one light control mechanism coupled to the at least one light source, wherein the at least one light control mechanism is disposed between the second side of the at least one glass slide and the at least one light source, wherein the at least one light control mechanism is configured for controlling at least one of at least one characteristic and at least one property of the light, wherein the at least one light controlling mechanism comprises at least two polarizing sheets and a securing pin attached to the at least two polarizing sheets, wherein the at least two polarizing sheets comprises a first polarizing sheet and a second polarizing sheet, wherein the first polarizing sheet is disposed on the second polarizing sheet, wherein the securing pin is configured for rotating the first polarizing sheet in relation to the second polarizing sheet, wherein the at least one characteristic comprises an intensity of the light, wherein the rotating is configured for the controlling of the intensity;

a first support structure coupled with the smartphone case, wherein the first support structure is configured for aligning with the opening of the smartphone case, wherein the first support structure is configured for removably receiving the at least one glass slide, wherein the at least one glass slide aligns with the camera based on the aligning;

a second support structure coupled with the first support structure, wherein the second support structure is aligned with the first support structure, wherein the second support structure is disposed in at least one of a position and an orientation in relation to the first support structure, wherein the second support structure is configured for receiving the at least one light source, wherein the at least one light source is associated with at least one of a first position and a first orientation in relation to the at least one glass slide based on the at least one of the position and the orientation of the second support structure; and at least one fastening element coupled with at least one of the first support structure and the second support structure, wherein the at least one fastening element is configured for securing the second support structure in relation to the first support structure in the at least one of the position and the orientation.

* * * * *